United States Patent [19]
Konovalov et al.

[11] Patent Number: 6,073,490
[45] Date of Patent: *Jun. 13, 2000

[54] SERVO ACCELEROMETER

[75] Inventors: Sergey Feodosievich Konovalov; Gennady Mikhaylovich Novosyolov, both of Moscow, Russian Federation; Chung-Oh Lee; Jun Ho Oh, both of Seoul, Rep. of Korea; Alexey Viktorovich Polynkov, Moscow, Russian Federation; Kwan-Sup Lee, Kyungkido, Rep. of Korea

[73] Assignee: Sergy Feodosievich Konovalov, Moscow, Russian Federation

[*] Notice: This patent issued on a continued prosecution application filed under 37 CFR 1.53(d), and is subject to the twenty year patent term provisions of 35 U.S.C. 154(a)(2).

[21] Appl. No.: 08/765,576

[22] PCT Filed: Jul. 27, 1994

[86] PCT No.: PCT/RU94/00138

§ 371 Date: Jan. 24, 1997

§ 102(e) Date: Jan. 24, 1997

[87] PCT Pub. No.: WO96/10185

PCT Pub. Date: Apr. 4, 1996

[51] Int. Cl.⁷ ..................................................... G01P 15/00
[52] U.S. Cl. ................. 73/514.17; 73/510; 73/514.31; 73/514.38; 73/497
[58] Field of Search ................ 73/497, 514.23, 73/514.21, 514.17, 514.16, 514.31, 514.01, 514.18, 514.36, 510, 514.02, 514.38

[56] References Cited

U.S. PATENT DOCUMENTS

| | | | |
|---|---|---|---|
| 4,498,342 | 2/1985 | Aske | 73/514.23 |
| 4,658,647 | 4/1987 | Shintani et al. | 73/514.23 |
| 4,697,455 | 10/1987 | Norling | 73/497 |
| 4,779,463 | 10/1988 | Woodruff | 73/497 |
| 4,854,169 | 8/1989 | Sakuma et al. | 73/497 |
| 4,887,467 | 12/1989 | Sakuma et al. | 73/497 |
| 4,891,982 | 1/1990 | Norling | 73/497 |
| 5,111,694 | 5/1992 | Fooye | 73/497 |

FOREIGN PATENT DOCUMENTS

| | | |
|---|---|---|
| A1 1606944 | 11/1990 | U.S.S.R. . |
| A1 1679395 | 9/1991 | U.S.S.R. . |
| 2 207 761A | 2/1989 | United Kingdom . |
| 2207761 | 2/1989 | United Kingdom . |

*Primary Examiner*—Richard A. Moller
*Attorney, Agent, or Firm*—Pennie & Edmonds LLP

[57] ABSTRACT

The present invention is a compensation accelerometer comprising a separable housing, a sensitive element mounted in the housing on an elastic suspension element, an angle sensor, a servo amplifier and a momentum sensor. In the proposed accelerometer, the blade of the sensitive element, the elastic suspension element and the frame for securing the sensitive element in the housing (support frame) are all made from a single block of monocrystalline silicon. In addition, the two halves of the separable housing, between which is situated the support frame for the sensitive element, each take the form of a block and a cup-shaped magnetic circuit for the momentum sensor. The block is formed from silicon monocrystal of the same orientation as the sensitive element block. The coils of the momentum sensor are secured on the blade of the sensitive element via intermediate plates formed from a silicon monocrystal of the same orientation as the sensitive element block. In the proposed accelerometer, the angle sensor comprises two differentially connected toroidal coils each of which is mounted on the central shaft of its own momentum sensor magnetic circuit. The angle sensor also has a high-frequency alternating signal generator which is connected to the input of the servo amplifier's power amplifier and to the control input of the demodulator which is part of the servo amplifier. According to the invention, the magnetic circuit of the momentum sensor in each half of the accelerometer's separable housing is connected to the silicon block by a connector element, namely, a thermal compensator whose component materials are selected during adjustment of the accelerometer to improve the latter's precision characteristics.

8 Claims, 9 Drawing Sheets

SERVO ACCELEROMETER

FIELD OF INVENTION

The present invention relates to force rebalance accelerometers in which an acceleration-sensitive movable element (proof mass) is maintained in a neutral position.

BACKGROUND OF THE INVENTION

A prior art accelerometer is described in U.S. Pat. No. 4,779,463. The servo accelerometer comprises a detachable case, suspension means for suspending the proof mass, placed in conductive tracks for supplying the current from the case to the proof mass means, said tracks being connected in series to form a compensation loop, comprising a differential angular-movement pickoff, a servo amplifier, and a differential torquer with movable coils.

In this device a proof mass paddle, four flexures of suspension means and a mounting frame are made of an integral wafer of the silicon monocrystal.

The disadvantages of said accelerometers are:

1) It is difficult to mount the proof mass within the device case.

2) There is a significant pickoff zero signal in stability, causing the accelerometer operation errors.

3) Carcasses on which the torque coils are wound are attached directly to the silicon base of the proof mass.

A second type of prior art accelerometer is described in U.S. Pat. No. 4,498,342. The servo accelerometer comprises a detachable case, suspension means for suspending the proof mass placed therein, and a gas damper. A differential pickoff, a preamplifier, a correction unit, a power amplifier and a differential torquer with movable coils are connected in series and form a compensation loop of said accelerometer. Here the proof mass base, suspension means and the mounting frame are made from the integral wafer of the silicon monocrystal.

In this accelerometer each stator of the torquer includes a permanent magnet, and each surface of the proof mass paddle has a force balancing coil (torquer coil) mounted on it. Current flowing through each coil produces a magnetic field that interacts with the permanent magnet of the associated stator, to produce a force applied to the proof mass. By controlling the electrical currents supplied to the coils, one can control the magnitude and direction of this force.

A differential pickoff of this device is implemented as a whetstone bridge whose arms include the tensoresistors. The tensoresistors are formed at the silicon flexures of elastic suspension means.

Movement of the proof mass with respect to the stators causes the differential resistance of the pickoff to change, which change can be used to determine a proof mass position.

In operation, the accelerometer is affixed to an object whose acceleration is to be measured. Acceleration of the object along the sensing axis results in rotation of the proof mass about the suspension axis with respect to the stators. The resulting differential resistance change caused by this movement of the proof mass is sensed by a feedback circuit. The feedback circuit responds by producing a current that, flows through the force balancing coils and produces a force that tends to return the proof mass to its neutral position. The value of the current required to return the proof mass in its neutral position allows to measure of acceleration along the sensing axis.

A compensation type accelerometer described above is the closest to the invention and therefore, is accepted by the authors as a prototype. The disadvantages of the prototype are:

1) Implementation of the pickoff as a tensoresistive bridge results in quite a high temperature drift of a zero signal of accelerometer pickoff. Since the device proof mass has the elastic suspension means, said zero signal drift causes a considerable error in operation of a compensation type accelerometer, which error is determined by the suspension means flexure stiffens.

2) The proof mass silicon wafer is not absolutely isolated from the influence of temperature strains of the accelerometer case, because the case is made of a material having the thermal expansion factor that differs from that of silicon.

3) The temperature strains of reducing bushes for attaching the torquer coils affect deformations of the proof mass paddle, for the thermal expansion factor of bushes is not equal to that of the proof mass paddle.

SUMMARY OF THE INVENTION

The present invention relates to the compensation type accelerometer which comprises a detachable case, suspension means for suspending the proof mass placed therein, a pickoff, a servoamplifier, and a torquer. In this accelerometer the proof mass paddle, suspension means, and a frame for mounting the proof mass to the case (mounting frame) are made from the integral wafer of silicon monocrystal.

Further, each half of the detachable case is implemented as a bar and between these halves there is a mounting frame of the proof mass. The bar is made of the silicon monocrystal having the same orientation as the proof mass water. The torquer coils are attached to the proof mass paddle through the connecting washers.

In the accelerometer, according to the invention, the pickoff consists of two differentially connected toroidal coils, each coil being attached to the central core of its torquer magnetic circuit.

According to the invention, in each half of accelerometer detachable case, the torquer magnetic circuit is joined with the silicon bar through the connector—the thermal compensator. The materials for thermal compensators are selected when adjusting the accelerometer so that the precision characteristics thereof would be improved.

DETAILED DESCRIPTION OF THE INVENTION

A compensation type accelerometer (FIG. 1) comprises a detachable case and a proof mass 2 disposed thereon on an elastic suspension means 1. A proof mass paddle 3, suspension means 1 and a mounting frame 4 are made of an integral wafer of the proof mass which is silicon monocrystal wafer. Differential torquer movable coils 7 and 8 are attached to paddle 3 through connecting washers 5 and 6.

Figure 1:
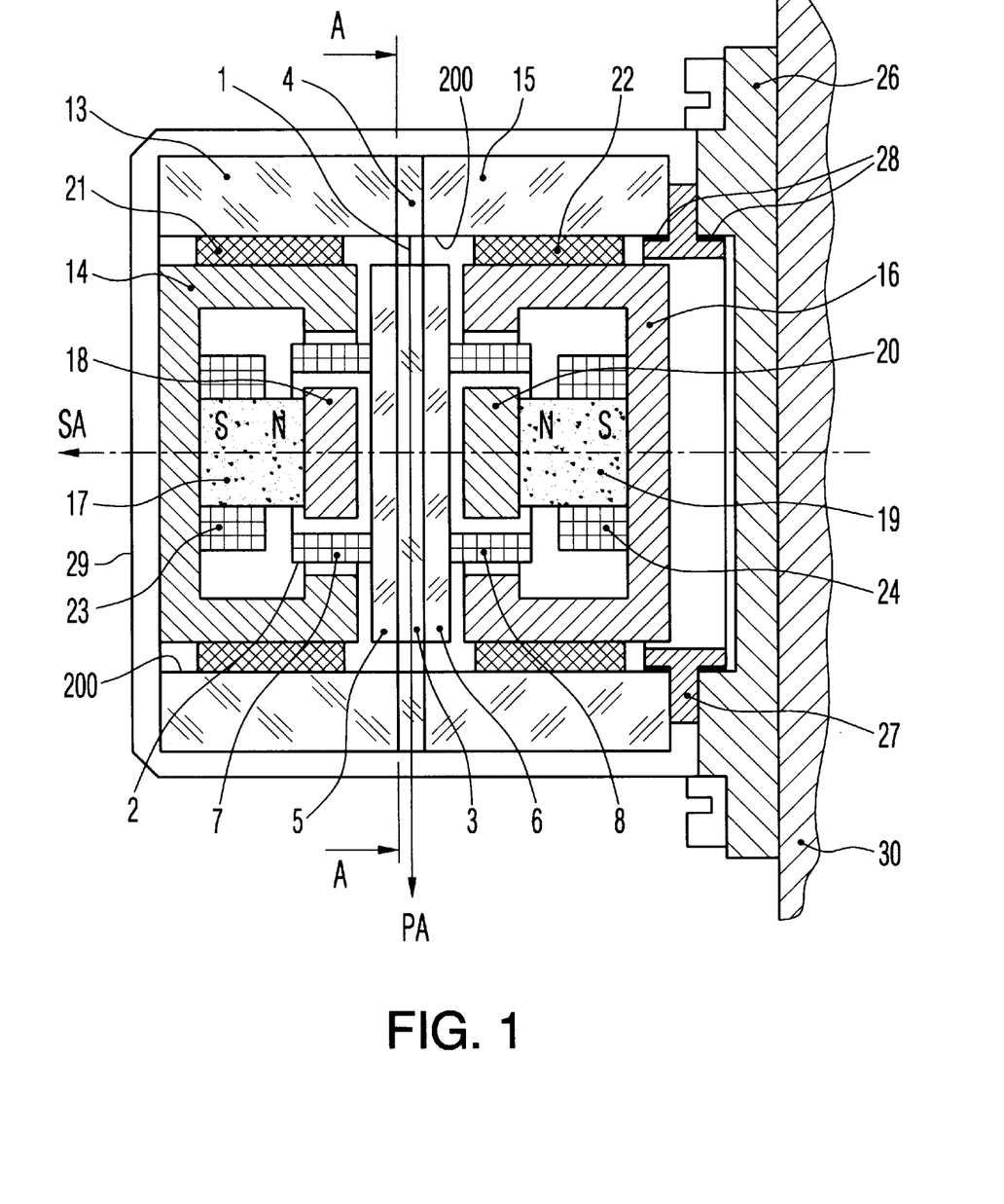
FIG. 1 is a cross-sectional view of an accelerometer, taken along its measurement axis SA and pendulum arm axis PA that represents the first embodiment.

The torquer coils 7 and 8 are supplied with the feedback current through the tracks 9 which may be provided as thin gold, aluminium, or copper stripes.

The conductive tracks for supplying the current from the accelerometer case to the proof mass may be also implemented in any other fashion. The left half of the detachable case is implemented as a bar 13 with a cylindrical opening 200 and a cup-shaped magnetic circuit 14 placed therein so that there is a gap. The right half of the detachable case of accelerometer is implemented in a similar way in the form of a bar 15 and a magnetic circuit 16. The cup-shaped magnetic circuit 14 has a central core, consisting of a permanent magnet 17 and a pole shoe 18 while the magnetic circuit 16 has a central core, consisting of a permanent magnet 19 and the pole shoe 20.

The bars 13 and 15 are made of a silicon monocrystal, having the same orientation of the axis of the silicon monocrystal as the proof mass wafer.

The cup-shaped magnetic circuits 14, 16 and the pole shoes 18, 20 are made of a magnetically soft material, for example, permalloy or ferrite.

The magnetic circuits 14, 16 are coupled to their silicon bars 13 and 15 by connecting pieces, that is, thermal compensators 21 and 22, respectively.

A thermal compensator has the form of a bush of an elastic material or a material, having the thermal expansion factor more than that of silicon and less than the thermal expansion factor of a magnetic circuit material.

On the central cores of the cup-shaped magnetic circuits 14 and 16 the toroidal coils 23 and 24, connected differentially are mounted.

The left and right halves of the detachable case of an accelerometer are interconnected, for example, with spring members 25.

The right half of the detachable case is affixed, on the mounting flange 26 of an accelerometer, for example by a clamping bush 27 and a glued joint 28.

The accelerometer assembly is covered by an outer protection cover 29, and mounted on an object 30 by a mounting flange 26.

There are three axes in accelerometer: SA which is an input (measurement) axis of an accelerometer, PA (FIG. 3a) which is an axis of a pendulum arm, and HA which is a hinge axis.

Figure 2:
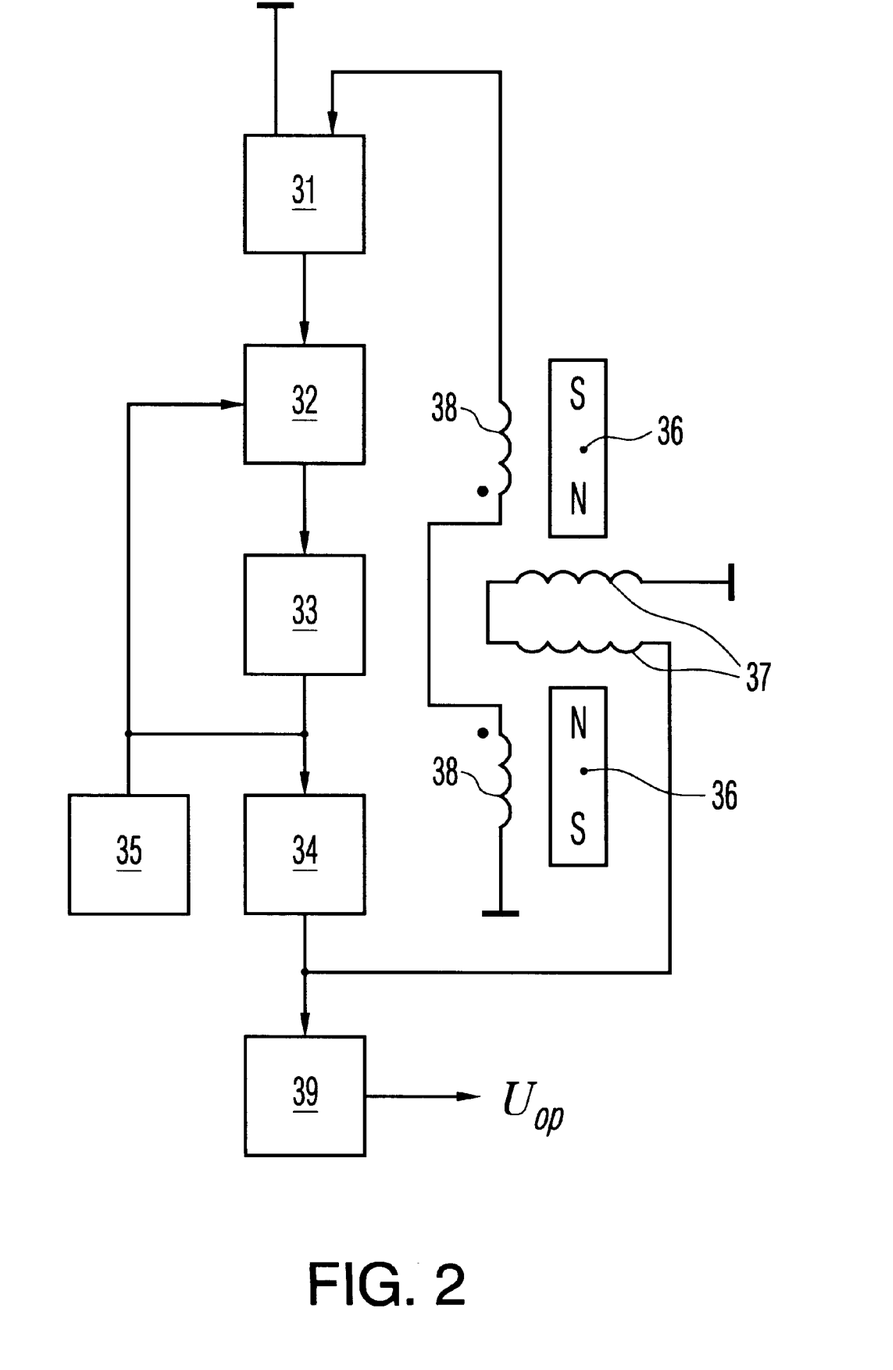
FIG. 2 is an electrical block-diagram of an accelerometer.

FIG. 2 illustrates: 31—preamplifier; 32—demodulator; 33—correction unit; 34—output stage (power amplifier); 35—HF oscillator; 36—permanent magnets of differential torquer; 37—torquer movable coils; 38—pickoff toroidal coils; 39—filters.

This accelerometer operates as a conventional compensation type one. When subjected to the acceleration a along the measurement axis SA of the device, the proof mass is deviated under the action of the inertia moment m·l·a (here m is a mass of the proof mass, l is a distance between the mass centre of the proof mass and the hinge axis HA thereof). The pickoff converts the deviation angle of the proof mass into an electrical signal. Connected in series a preamplifier, a demodulator, a correction unit, a power amplifier form a accelerometer servoamplifier and provide a signal that counterbalances the inertia moment. Current $I_{OP}$ flowing through the torquer coils, is the output signal of accelerometer.

The essential attribute of the claimed accelerometer is the pickoff construction and operating conditions. As soon as the HF oscillator 35 (FIG. 2) output is connected to the input of power amplifier 34 the high-frequency alternating current flows through the torquer movable coils 37 along with the feedback current. This current creates an alternating magnetic flux which flows through the pickoff toroidal coils 38 disposed on the central cores of the torquer magnetic circuits. These magnetic fluxes, flowing through the pickoff toroidal coils 38, vary in magnitude when the proof mass position relative to the accelerometer case changes because under the proof mass displacement varies the magnetic-flux linkage between the movable coils and magnetic circuit.

In the pickoff coils the alternating voltages are induced. The amplitude of these voltages depends on the interposition of the torquer movable coils and pickoff coils, that is, on the proof mass of the accelerometer relative to its case.

The differentially connected pickoff coils enable the high-frequency alternating output signal. Its amplitude is proportional to the deviation angle of the proof mass while the phase depends on the deviation thereof.

Thus, in the accelerometer according to the invention, the torquer movable coils 7 and 8 act as the pickoff windings, and in both the pickoff and the torquer common magnetic circuit is used. This simplifies the mechanical part of construction.

In as much the bars 13 and 15 of the detachable case of the accelerometer are made of a silicon monocrystal, having the same orientation as a wafer of the proof mass, a variation in temperature does not result in that would appear, any stresses at the junction of these bars because of a difference between the thermal expansion factors of the parts to be joined.

Figure 3A:
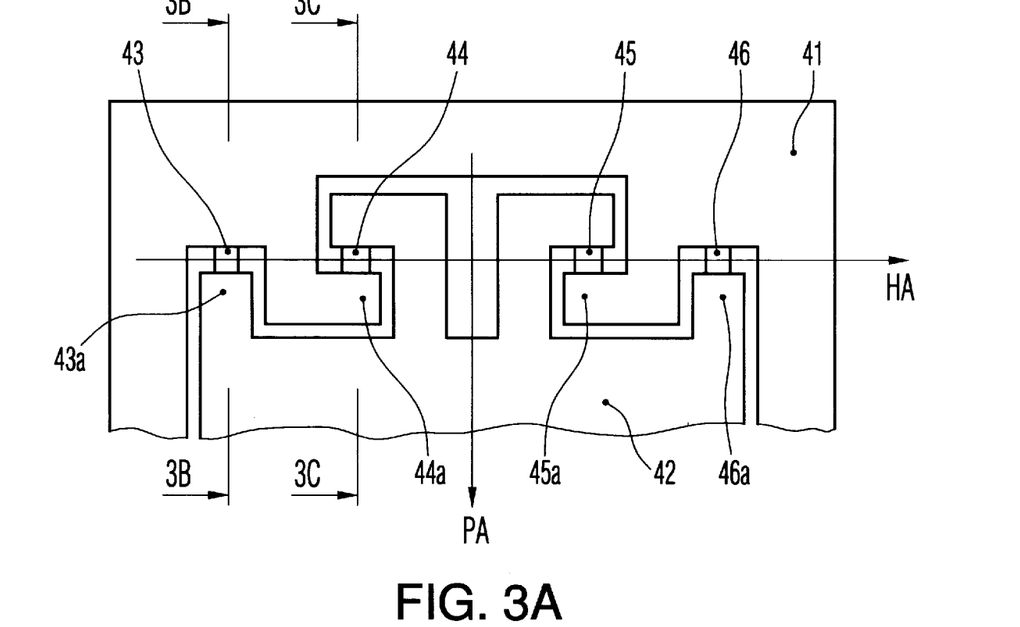
FIGS. 3a, 3b, 3c is an embodiment of accelerometer where the suspension means of proof mass includes four flexures, lying in the same plane.
Figure 3B:
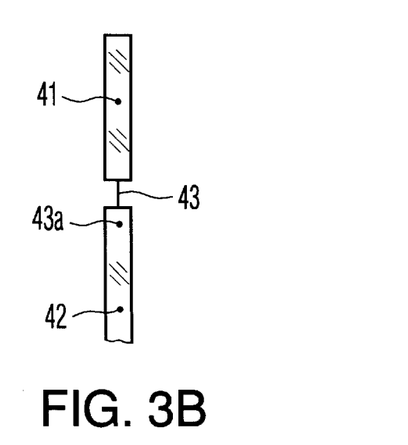
Figure 3C:
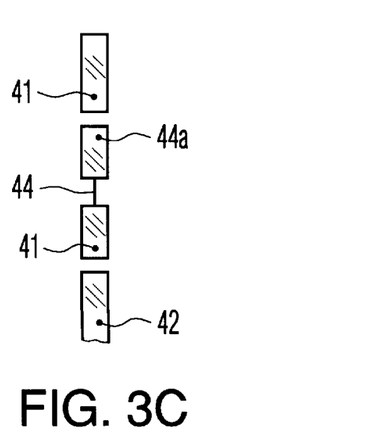

FIGS. 3a, 3b, 3c illustrates an embodiment of the elastic suspension means. It shows the upper part of the proof mass wafer: 41—mounting frame; 42—proof mass paddle; 43 . . . 46—beams of the elastic suspension means; 43a, 44a, 45a and 46a- projections on the proof mass paddle. All four flexures are disposed in one plane, which is neutral relative to the outer surfaces of the proof mass wafer. The flexures are disposed symmetrically relative to the hinge axis HA of the proof mass and relative to the pendulum arm axis PA thereof. Ends of flexures 43 and 44, disposed on one side from axis PA and behind axis HA from the proof mass, are secured differently: the first end of flexure 43 is secured in the mounting frame the second end of flexure 43 is secured in the proof mass on the projection 43a, while the end of flexure 44 is secured in the proof mass paddle on the projection 44a. Flexures 45 and 46 are provided symmetrically to the flexures 43 and 44 relative to axis PA.

Such implementation of the suspension means beams guards against the loss of their stability when there is an acceleration along the axes PA and HA.

Figure 4:
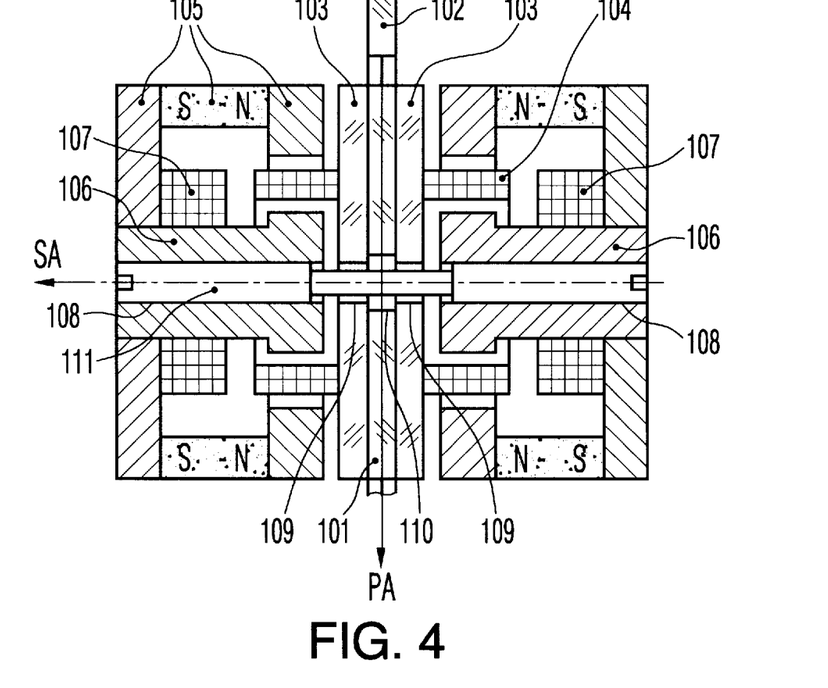
FIG. 4 is an embodiment of accelerometer where there is means to protect the suspension means from the destruction.

FIG. 4 illustrates an embodiment of elements for adjusting the pickoff and elements for protecting the elastic suspension means against destruction. It shows: 101—proof mass paddle; 102—suspension means; 103—connecting washer; 104—torquer coil; 105—cup-shaped magnetic circuit; 106—central core of magnetic circuit; 107—pickoff coil; 108—opening in the central core of magnetic circuit; 109—central opening in the connecting washer; 110—rectangular opening in the proof mass paddle; 111—three-stage core cylindrical of a nonmagnetic material.

In central cores 106 of magnetic circuits 105 there are the through central coaxial cylindrical openings 108. Besides, the connecting washers 103 also have the through central cylindrical opening 109. These openings are coaxial with openings 108 in central cores 106 of magnetic circuits. All central openings 108 and 109 have the same diameter. The production technique, used for accelerometer assembling, provides the alignment of openings along the axis. And finally, in proof mass paddle 101 there is a through rectangular opening 110. The least size of opening 110 exceeds or equal to diameter of openings 108 and 109.

Three-stage cylindrical core 111 is placed into openings 108, 109 and 110. Diameters of the extreme stages of core 111 are equal to those of openings 108 and 109. Diameter of the middle stage of core 111 is less than that of openings 109 in connecting washers 103. The length of the middle stage of core 111 exceeds or equal to the minimum distance between the pole shoes of central cores 106.

Such embodiment of an accelerometer ensures safety of the elastic suspension means beams of the proof mass when there are considerable acceleration projections on a plane, extending through the axes PA and HA of an accelerometer. The proof mass can move within the plane of axes PA-HA just until there is a clearance between opening 109 walls in the connecting washers 103 and the middle stage of core 111. When during the movement of the proof mass within the plane of axes PA-HA, opening 109 wall gets in touch with the middle stage of core 111, dangerous strains of the elastic suspension means beams will stop. Thus, their protection is provided.

When the acceleration projection on a plane of axes PA-HA is decreased up to an allowed value, the accelerometer proof mass affected by elastic forces of compressed flexures of the elastic suspension means 43a, 44a, 45a and 46a-projections on the proof mass paddle goes out of touch with core 111, and the compensation type accelerometer recovers its normal operation mode.

The total length of the three stage of core 111 is less than the distance between the outer faces of cup-shaped magnetic circuits 105. Core 111 itself is made of a magnetically soft material. This construction along with the protection of on elastic suspension means flexures against a failure provides the possibility to adjust the accelerometer pickoff output. This is done by means of changing the position of ferromagnetic core 111 relative to the pickoff coils 107.

Figure 5:
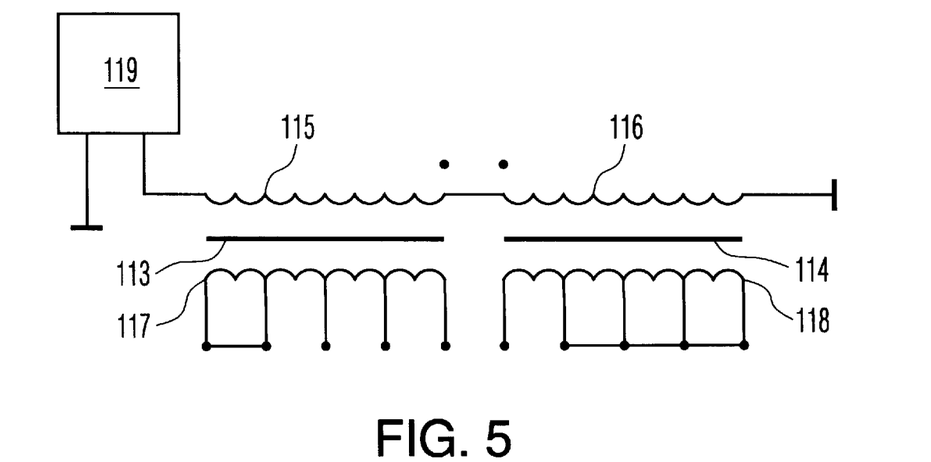
FIG. 5 is an embodiment of accelerometer where there is means to provide adjustment of pickoff output through the short-circuiting the sections of coils.

On each central core 113 and 114 of the torquer magnetic circuits, in addition to main coils 115 and 116 of pickoff, extra toroidal adjusting coils 117 and 118 are secured (FIG. 5). The main coils 115 and 116 of the pickoff, being differentially connected to one other, and connected to the preamplifier 119 input of the accelerometer compensation loop.

In adjusting the pickoff output signal, a portion of sections of the extra coils 117 and 118 is closed thereby forming the shorted winds. Thus, the quadrature component of the pickoff signal may be adjusted.

Figure 6:
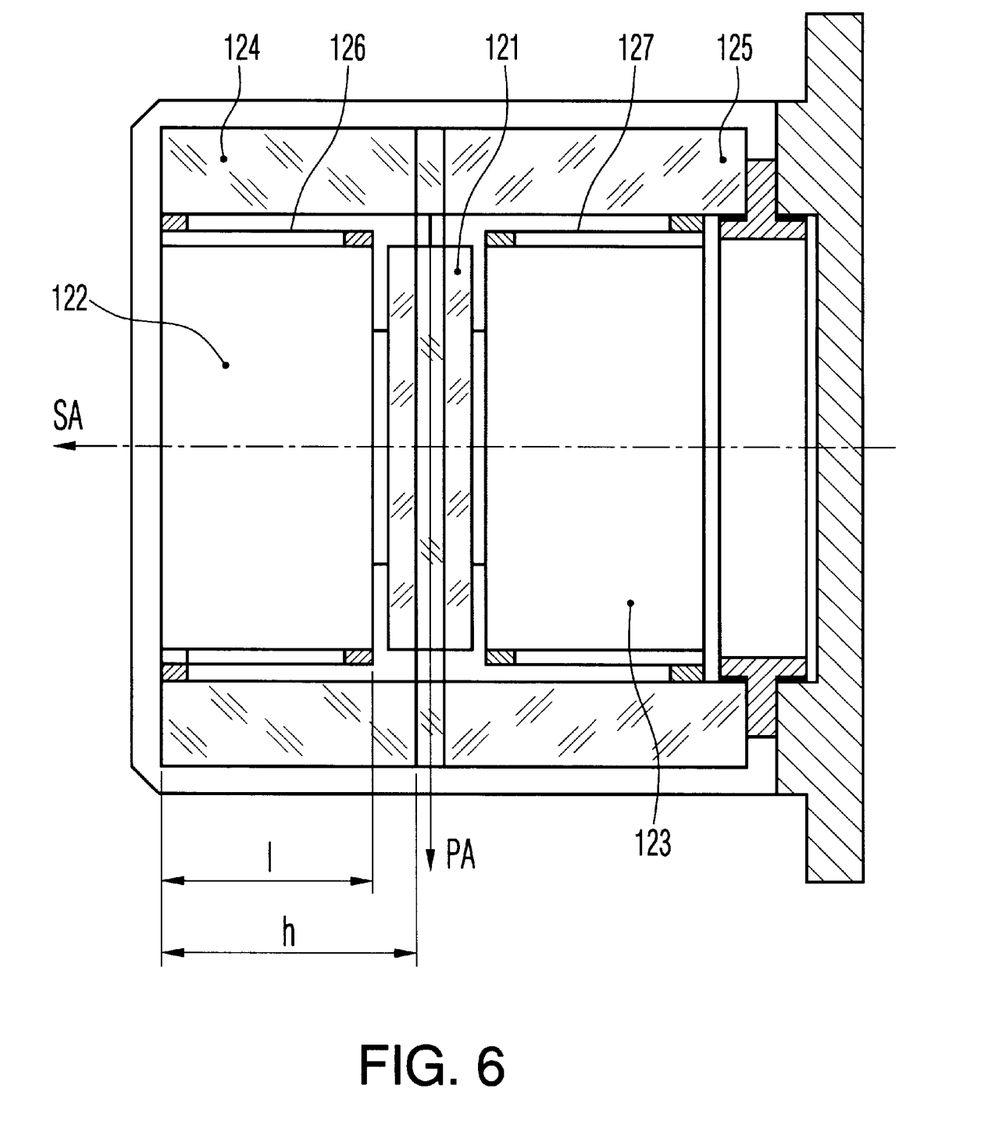
FIG. 6 illustrates operation of means for compensating embodiment of the thermal expansion of a case material and a material of permanent magnets fluxes sources, according to the invention.

FIG. 6 illustrates a means for compensating thermal expansion of a case material and a material magnetic circuit.

FIG. 6 shows: 121—proof mass; 122, 123—cup-shaped magnetic circuits; 124, 125—silicon bars of the detachable case; 126, 127—thermal compensators.

The length of the thermal compensator bush is approximately equal to the height of the cup-shaped magnetic circuit. A portion of the thermal compensator bush, for example 126, facing proof mass 121, is secured to the magnetic circuit 122. Another bush 126 portion is secured to silicon bar 124. Thermal compensator 127 is secured similarly to thermal compensator 126.

Assuming that both thermal compensators of device are made of the same material, having the thermal expansion factor approximately equal to the thermal expansion factor of a silicon bar. In this case thermal expansion of silicon bar 124 of the detachable case along axis SA is compensated by thermal expansion of bush 126 along the same axis, and the gap between the face of magnetic circuit 122 (facing the proof mass) and the proof mass accelerometer remains approximately constant. For the right half of device everything is the same.

Assuming that the first thermal compensator, for example 126, in the first half of detachable case is made of a material, having the thermal expansion factor $\alpha_{T1}$. The second thermal compensator 127 is made of a material, having the thermal expansion factor $\alpha_{T2}$, that is approximately equal to the thermal expansion factor $\alpha_{Si}$ of silicon.

Such a combination of materials for the accelerometer parts permits to decrease the impact of the temperature drift of the pickoff zero signal on precision of its operation.

Consider the following case. Assume the pickoff zero signal is equal to $U^*_o$ at adjustment temperature $t^*$ of pickoff, but at the temperature change of $t=t^*+\Delta t$, the zero signal will be determined by the expression $U_o=U^*_o+\Delta U_o$. Then factur $k_{Ut}$ of the temperature drift of the pickoff zero signal is defined as $$k_{Ut}=\Delta U_o/\Delta t \tag{1}$$

Let us assume that the pickoff rotor, being in position of adjustment (the pickoff output signal is equal to its zero signal $U_o$), is displaced relative to the stator by value $\Delta x$. In this position of displacement the pickoff output signal U is equal to $U=U_o+\Delta U$, while the pickoff transfer ratio $k_{PO}$ is defined as $$k_{PO}=\Delta U/\Delta x \tag{2}$$

Let us select a material for the first thermal compensator (i.e. select $\alpha_{T1}$) so that the temperature variation $\Delta U_o$ of the pickoff zero signal would be compensated by the temperature variation $\Delta U$ of the pickoff output signal at the variation in temperature by $\Delta t$. So that, to provide $\Delta U_o=\Delta U$ in the expression $U=U^*_o+\Delta U_o+\Delta U$ for the pickoff output signal.

The variation $\Delta h$ of the silicon bar 124 thickness h will be $\Delta h=h_o\cdot\alpha_{Si}\cdot\Delta t$ (where $h_o$ is a thickness of the silicon bar 124 at the temperature $t^*$). The variation $\Delta l$ of the thermal compensator bush 126 length is equal to $\Delta l=l_o\cdot\alpha_{T1}\cdot\Delta t$ (where $l_o$ is a length of the thermal compensator bush at the temperature $t^*$). The displacement $\Delta x_c$ of the pickoff stator coil, disposed on the central core of magnetic circuit 122 relative to the pickoff rotor (relative to the proof mass) is equal to $\Delta x_c=\Delta l-\Delta h=(l_o\cdot\alpha_{T1}-h_o\cdot\alpha_{Si})$ t. Since $l_o=h_o$, $$\Delta x_c \approx l_o\cdot(\alpha_{T1}-\alpha_{Si})\Delta t \tag{3}$$

To provide the compensation, as noted above, it is required to have $\Delta U_o = \Delta U$. And, according to (1), $\Delta U_o$ is equal to $k_{Ut} \cdot \Delta t$, while $\Delta U$, according to (2) is $K_{PO} \cdot \Delta x$.

Here it should be noted that the pickoff under consideration is a differential one and therefore, to vary its output signal by value $\Delta x$, it is necessary to displace the position of rotor relative to the stator by the value $\Delta x$, and one stator coil (the coil in magnetic circuit 122) relative to the rotor (relative to the proof mass) by value $\Delta x_c = 2 \cdot \Delta x$. Thus, it is required to provide $\Delta U_o = \Delta U$, that is, $$k_{Ut} \cdot \Delta t = K_{PO} \cdot \Delta x = K_{PO} \cdot \Delta x_c / 2 \qquad (4)$$

and consequently, $$\Delta x_c = 2 \cdot k_{Ut} \cdot \Delta t / K_{PO} \qquad (5)$$

Taking into account (3), we obtain $l_o \cdot (\alpha_{T1} - \alpha_{Si}) \cdot \Delta t = 2 K_{Ut} \cdot \Delta t / K_{PO}$, or $$\alpha_{T1} - \alpha_{Si} = 2 \cdot k_{Ut} / (K_{PO} \cdot l_o) \qquad (6)$$

So, if the thermal compensator 126 material is selected as having the thermal expansion factor $\alpha_{T1}$, which satisfies the dependence (6), the variation in temperature of the pickoff zero signal will be compensated, and this variation will not affect, through the stiffness of the elastic suspension means, the precision of the accelerometer operation.

The list of materials for manufacturing thermal compensators to design an accelerometer is restricted, and it is practically impossible to ensure exact dependence (6).

For this reason the first thermal compensator, for example 126, can be made of a material having the thermal expansion factor $\alpha_{T1}$, while the second thermal compensator 127 can be made of a material having the thermal expansion factor $\alpha_{T2}$.

Hence, a movement of the first pickoff stator coil, disposed in magnetic circuit 122, relative to the pickoff rotor, in accordance with (3), is equal to $\Delta x_{C1} \approx l_o \cdot (\alpha_{T1} - \alpha_{Si}) \cdot \Delta t$, while a movement of the second pickoff stator coil, disposed in magnetic circuit 123, is $\Delta x_{C2} \approx l_o \cdot (\alpha_{T2} - \alpha_{Si}) \cdot \Delta t$.

The compensation condition $\Delta U_o = \Delta U$ may be achieved if $\Delta x_{C1} + \Delta X_{C2} = 2 \cdot k_{Ut} \cdot \Delta t / K_{PO}$ (see (5)) or if $\Delta x_{C1} - \Delta X_{C2} = 2 \cdot k_{Ut} \cdot \Delta t / K_{PO}$.

Thus, finally, the dependence to determine $\alpha_{T1}$ and $\alpha_{T2}$ may be represented as:

$$(\alpha_{T2} - \alpha_{Si}) \pm (\alpha_{T1} - \alpha_{Si}) = 2 \cdot k_{Ut} \cdot \Delta t / (K_{PO} \cdot l_o) \qquad (7)$$

To compensate the temperature variations of the zero signal T of the entire device is possible.

We explain this. Let us assume that at temperature $t^*$ of accelerometer adjustment its zero signal is equal to $I_o^*$, but at temperature variation $t = t^* + \Delta t$ the zero signal of device is determined by expression $I_o = I_o^* + \Delta I_o$. In this case, factor $k_{lt}$ of the temperature drift of the zero signal will be defined as $$k_{lt} = \Delta I_o / \Delta t \qquad (8)$$

A variation of accelerometer zero signal value by $\Delta I_o$ is caused by variation $\Delta M_t$ of the moment of force of tension $M_T$ in the device $$\Delta M_T = K_{PO} \cdot \Delta I_o, \qquad (9)$$

where $K_{TM}$ is a transfer ratio of the accelerometer torquer.

The variation $\Delta M_T$ of the moment of force of tension in the accelerometer, and therefore variation $\Delta I_o$ of device zero signal, may be compensated by variation $\Delta \beta$ of deviation angle $\beta$ of the accelerometer proof mass. When the proof mass deviates by angle $\Delta \beta$, the additional moment $\Delta M = C \cdot \Delta \beta$ is applied to it (where C is a stiffness of the elastic suspension means for the proof mass).

Variation $\Delta \beta$ of deviation angle $\beta$ of the proof mass we produce intentionally through the variation of the pickoff output signal. if value $\Delta \beta$ is selected such that there is the equality $\Delta M = \Delta M_T$ or $C \cdot \Delta \beta = K_{TM} \cdot \Delta I_o$, then variation $\Delta M_T$ will be compensated by a variation of angle $\beta$.

The intentional variation $\Delta U$ of the pickoff output signal we shall cause by moving the stator coil together with magnetic circuit 122, relative to the pickoff rotor. This intentional movement is specified by selection of a material for thermal compensator 126.

Figure 7:
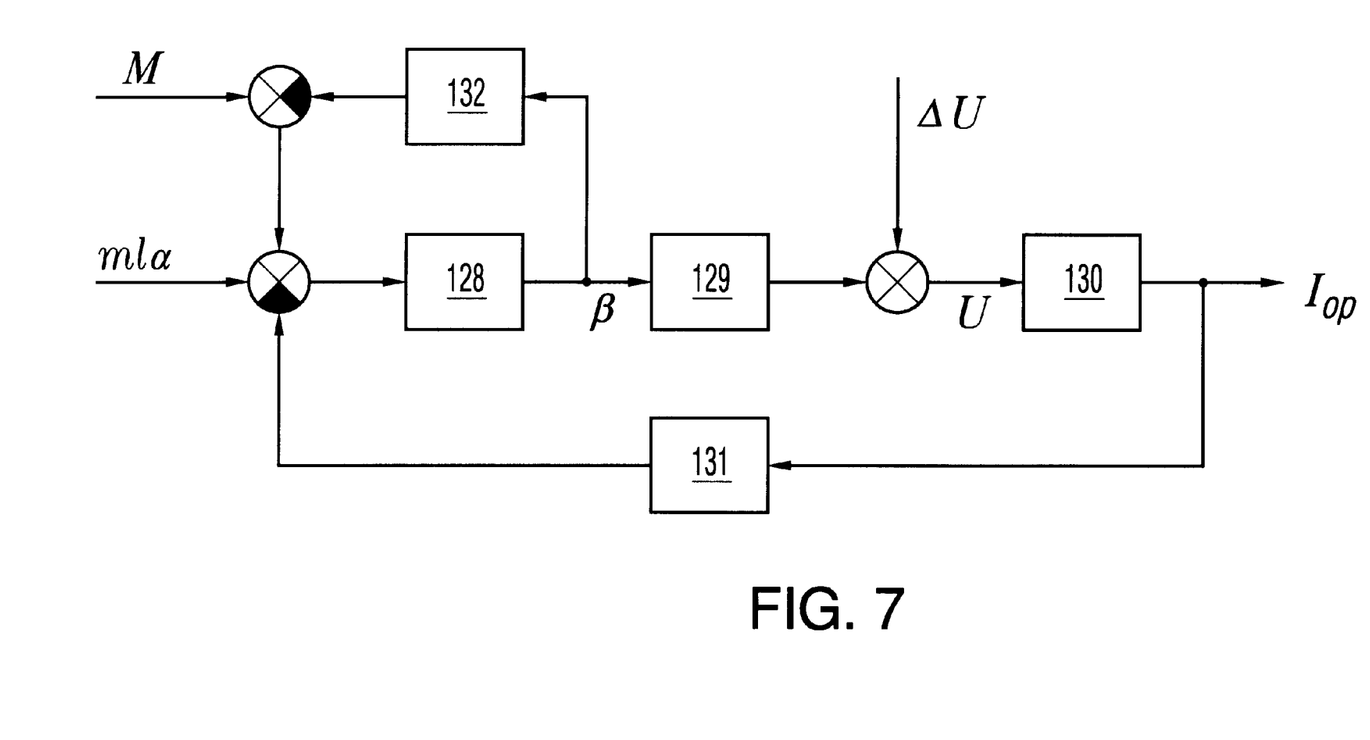
FIG. 7 is a block diagram, illustrating how to provide its zero signal compensation.

The foregoing be explained by the structural block-diagram illustrated in FIG. 7. It shows: 128—transfer function $W_{PM}$ of the proof mass; 129—pickoff transfer ratio $K_{PO}$; 130—transfer ratio $K_{SA}$ of a preamplifier, a correction unit and a power amplifier, connected in series; 131—torquer transfer ratio $K_{TM}$; 132—stiffness C of the elastic suspension means for the proof mass; $m \cdot l \cdot \alpha$—inertia moment; $M_T$—moment of force of tension; $\beta$—rotation angle of the proof mass; U—pickoff output signal; $\Delta U$—intentionally specified variation of pickoff output signal.

In accordance with the block-diagramm in FIG. 7, the specified variation $\Delta U$ of pickoff 129 output signal U will cause variation $\beta$ of angle $\beta$ according to the following dependence $$\frac{\Delta \beta}{\Delta U} \frac{K_{SA} K_{TM} K_{PM}}{1 + K_{SA} + K_{TM} K_{PO} W_{PM}} \text{ or}$$

$$\Delta \beta = \Delta U \cdot K_{SA} \cdot K_{TM} \cdot W_{PM} / (1 + K_{SA} K_{TM} K_{PO} W_{PM}) \qquad (10)$$

It follows from the expression (4) that intentional variation $\Delta U$ of pickoff output signal, specified by thermal compensator 126, is equal to $U = K_{PO} \Delta x_C / 2$. Or, taking into account (3), we obtain $$\Delta U = 0.5 \cdot K_{PO} \cdot l_o \cdot (\alpha_{T1} - \alpha_{Si}) \cdot \Delta t \qquad (11)$$

In accordance to (8) and (9), the variation will be $\Delta M_T = K_{TM} \cdot K_{lT} \cdot \Delta t$. This variation $\Delta M_T$ is compensated by excess torque $\Delta M = C \cdot \Delta \beta$. By providing the equality between $\Delta M_T$ and $\Delta M$, taking into consideration (10) and (11), we shall obtain $$K_{TM} k_{lt} \Delta t = C \frac{k_{SA} k_{TM} W_M}{1 + K_{SA} K_{TM} K_{PO} W_{PM}} 0.5 K_{PO} l_O (\alpha_{TI} - \alpha_{Si}) \Delta t, \qquad (12)$$

or $$\alpha_{TI} - \alpha_{Si} = \frac{2 K_{TM} k_{lt}}{C l_O} \left( 1 + \frac{1}{K_{SA} K_{TM} K_{PO} W_{PM}} \right)$$

The transfer function $W_{PM}$ of the proof mass is $W_{PM} = 1/(Ip^2 + Bp + C)$, where I—inertia moment of the proof mass; B—damping factor; C—stiffness of suspension means for the proof mass; p—Laplace operator.

Compensation mode of momentums $\Delta M_T = \Delta M$ is equivalent to the static mode in which $p = 0$ and $W_{PM} = 1/C$. Substituting the expression, obtained for $W_{PM}$ in (12), we finally obtain:

$$\alpha_{TI} - \alpha_{Si} = 2 \cdot \frac{K_{TM} k_{lt}}{C \cdot l_O} \cdot \left(1 + \frac{C}{K_{SA} K_{TM} K_{PO}}\right) \quad (13)$$

Thus, selecting the material for thermal compensator 126 in accordance with dependence (13) we compensate variations of accelerometer zero signal.

Possible is the compensation of zero signal $I_o$ of the device by selecting materials for both thermal compensators.

Let us assume that thermal expansion factor of material for the first thermal compensator is equal to $\alpha_{T1}$, for the second one is $\alpha_{T2}$. Then, similarly to dependencies (7) and (13) we shall obtain for the fifth version:

$$(\alpha_{T2} - \alpha_{Si}) \pm (\alpha_{TI} - \alpha_{Si}) = 2 \cdot \frac{K_{TM} k_{lt}}{C \cdot l_O} \cdot \left(1 + \frac{C}{K_{SA} K_{TM} K_{PO}}\right) \quad (14)$$

Figure 8A:
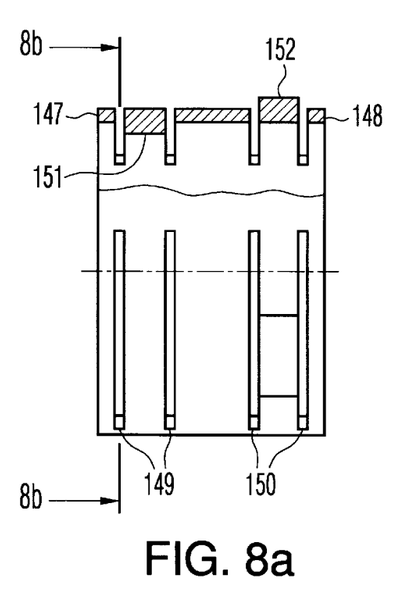
FIGS. 8a and 8b show an embodiment of thermal compensator cylindrical bush.
Figure 8B:
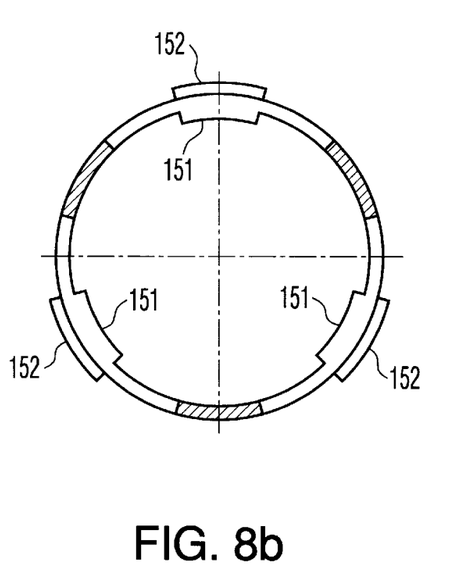

FIG. 8 illustrates the thermal compensator cylindrical bush. The bush has on each face side 147 and 148 several pairs of through slots 149 and 150. The number of slot pairs on each face of the bush is the same. Thus in FIG. 8, for example, there are three pairs of through slots 149 on the face side 147 of the bush. On the face side 148 of the bush there are also three pairs of through slots 150. Pairs of slots 149 on the face side 147 of a thermal compensator are disposed symmetrically to pairs 150 of slots on the face side 148 of a thermal compensator relative to the plane normal to the bush axis and crossing the bush in the middle.

Three surfaces 151 and three surfaces 152 are the areas of securing a thermal compensator to, a torquer cup-shaped magnetic circuit and a silicon bar.

Figure 9:
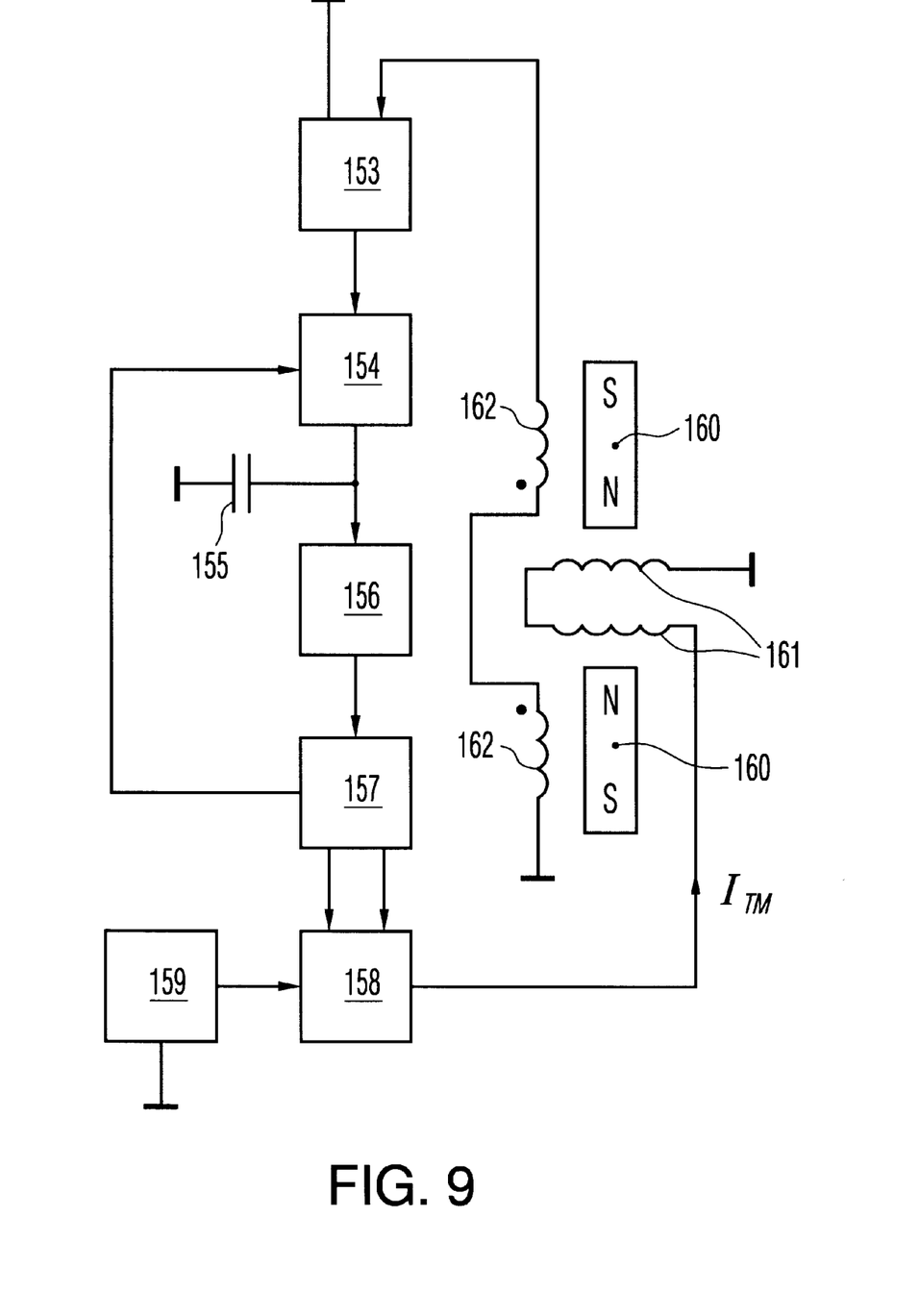
FIG. 9 is an embodiment of accelerometer where a pulse modulator is used.

FIG. 9 represents an electric diagram of a accelerometer. It shows: 153—preamplifier; 154—switch; 155—storing capacitor; 156—correction unit; 157—pulse modulator; 158—switching circuit; 159—current generator; 160—torquer permanent magnets; 161—pickoff coils; 162—pickoff coils, $I_{TM}$—torquer current (feedback current).

Figure 10A:
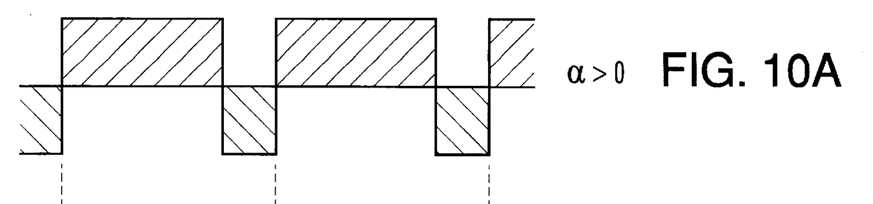
FIGS. 10a, 10b and 10c show a timing diagram of feedback current when a pulse-width modulator is used.
Figure 10B:
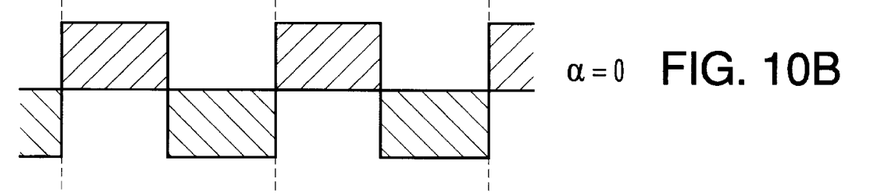
Figure 10C:
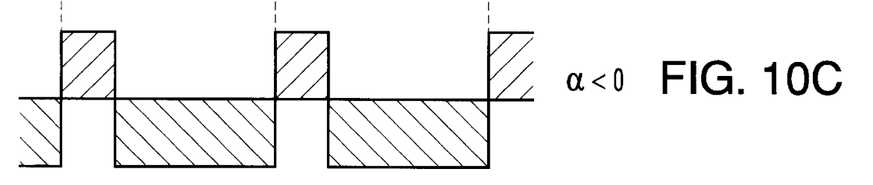
Figure 11A:
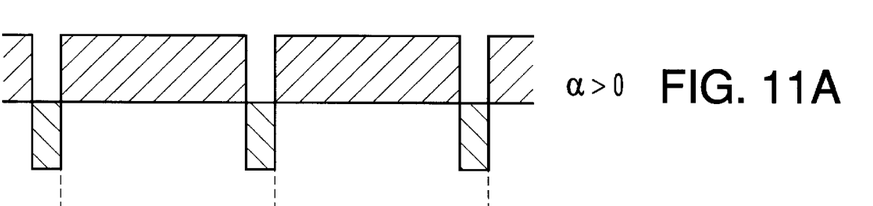
FIGS. 11a, 11b and 11c show a timing diagram of feedback current when a pulse-relay modulator is used.
Figure 11B:
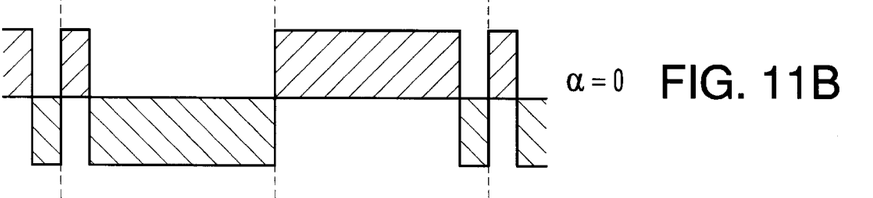
Figure 11C:
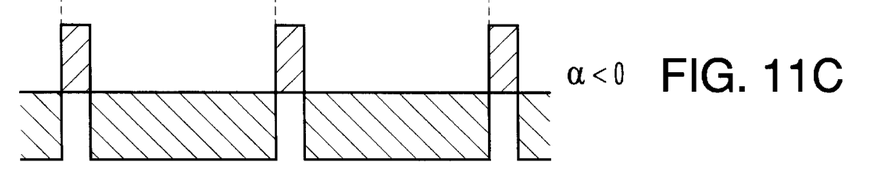

FIGS. 10 and 11 illustrate the temporal diagrams of feedback current in cases of using a-pulse width modulator (FIG. 10) and pulse-relay modulator (FIG. 11) as a pulse modulator.

When the leading edge of feedback current pulses pass through the torquer coils, a variation of a magnetic flux in the pickoff magnetic circuits induces pulse EMF in each coil of of the pickoff. The amplitude of this EMF in each coil depends on the deviation angle of the accelerometer proof mass. The pickoff coil are connected differentially, therefore the resulting voltage amplitude at the pickoff output is proportional to the deviation angle of the proof mass, but polarity of the resulting voltage depends on the sign of deviation angle of the proof mass.

The considered resulting voltage at the pickoff output is periodically applied to storing capacitor 155 through switch 154 (see FIG. 9).

An outer protection cover of accelerometer may be made from magnetically soft material.

Connecting washers, for securing the torquer coils to the proof mass paddle, may be made of materials having the thermal expansion factor exceeding, than that of the proof mass wafer and less, than the thermal expansion factor of the torquer coils.

What is claimed is:

1. A servo accelerometer, comprising
    a detachable case comprising two symmetrically positioned bars of silicon monocrystal, in which bars implemented are cylindrical openings arranged along one axis of symmetry,
    a mounting frame disposed between said two bars and made of silicon monocrystal, the silicon monocrystal of said mounting frame having a same orientation as the silicon monocrystal of said case,
    a proof mass having a paddle whereon implemented are four projections and which paddle is disposed in said case on an elastic suspension means disposed in said mounting frame, said mounting frame, said paddle of the proof mass and said elastic suspensions constitute a single element of a structure made of silicon monocrystal,
    a differential pick-off of the angular-movement of a position of said proof mass relative to the case,
    a differential torque pick-off secured in said detachable case and having two movable coils and two sources of constant magnetic fluxes,
    means for compensating thermal expansions of said movable coils, said means being rigidly coupled to said movable coils and disposed between said movable coils and said paddle of the proof mass and secured on said paddle,
    means for compensating thermal expansions of a material of said case and a material of said constant magnetic fluxes sources, and disposed within a clearance between said bars and said constant magnetic fluxes sources,
    a servo amplifier electrically coupled to said differential angular-movement pick-off and said differential torque pick-off and constituting, together with said pick-offs, a compensating loop.

2. A servo accelerometer as claimed in claim 1, wherein each said constant magnetic fluxes source comprises a magnetic conductor of a magnetically soft material, having a central core, which core has a constant magnet with an axial polarization and a polar shoe of a magnetically soft material,
    a clearance between said magnetic conductor and said polar shoe, within which clearance disposed is said corresponding movable coil.

3. A servo accelerometer as claimed in claim 2, wherein said differential pick-off of the angular-movement of a position of said proof mass relative to the case comprises two differentially connected toroidal coils, each of which coils is secured on the central core of a corresponding magnetic conductor,
    two additional toroidal coils, each of which coils is secured on the central core of a corresponding magnetic conductor and has at least several sections.

4. A servo accelerometer as claimed in claim 1, wherein means for compensating thermal expansions of said movable coils is implemented in the form of two washers secured on said proof mass and made of a material having K thermal expansion factor within the range of A<K<B, where A is thermal expansion factor of said wafer of the proof mass, B is thermal expansion factor of a material of said movable coils.

5. A servo accelerometer as claimed in claim 1, wherein means for compensating thermal expansions of a material of said case and a material of said constant magnetic fluxes sources is implemented in the form of two cylindrical bushes aligned coaxially with said constant magnetic fluxes sources,
    each of said coils have a length that is approximately equal to the height of a magnetic conductor of said constant magnetic fluxes sources,
    at least three projections implemented on the outer surface of each of said coils and intended to contact said internal cylindrical surface of corresponding bars, at least three projections implemented on the inner surface of each of said bushes and intended to contact said outer cylindrical surface of corresponding magnetic conductors.

6. A servo accelerometer as claimed in claim 1, wherein said elastic suspension means is implemented in the form of four elastic bridges disposed in one plane, being the symmetry plane of said paddle of said proof mass, parallel to the surface plane of said paddle, said four elastic bridges are positioned along an axis being the axis of the suspension means for said paddle, two bridges of said four bridges are formed between said projections of the paddle, which projections are located nearer to the symmetry plane that is perpendicular to said suspension axis being the axis of a pendulum arm of said proof mass, and said mounting frame, two other bridges of said four bridges are formed between said paddle projections located farther off said pendulum arm axis, and said mounting frame.

7. A servo accelerometer as claimed in claim 2, further comprising a core positioned in through co-axial openings implemented in said central cores of magnetic conductors, in said means for compensating thermal expansions of said movable coils and in said paddle of the proof mass, said core has two cylindrical projections implemented on the cylindrical surface and intended to contact the inner surface of said openings in said central cores of the magnetic conductors.

8. A servo accelerometer as claimed in claim 1, having a protection cover intended to accommodate the detachable case therein.

* * * * *